(No Model.) 7 Sheets—Sheet 3.

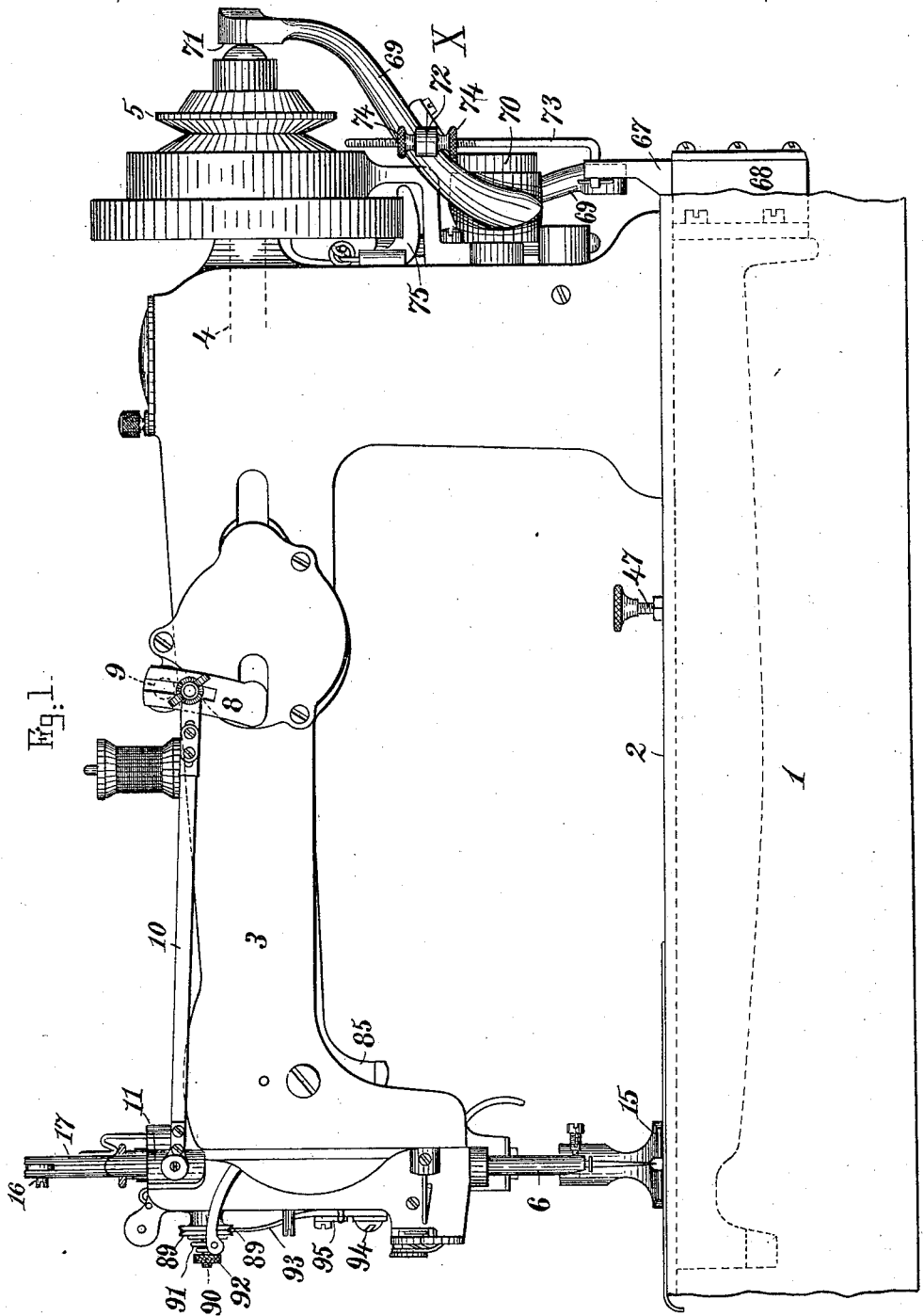

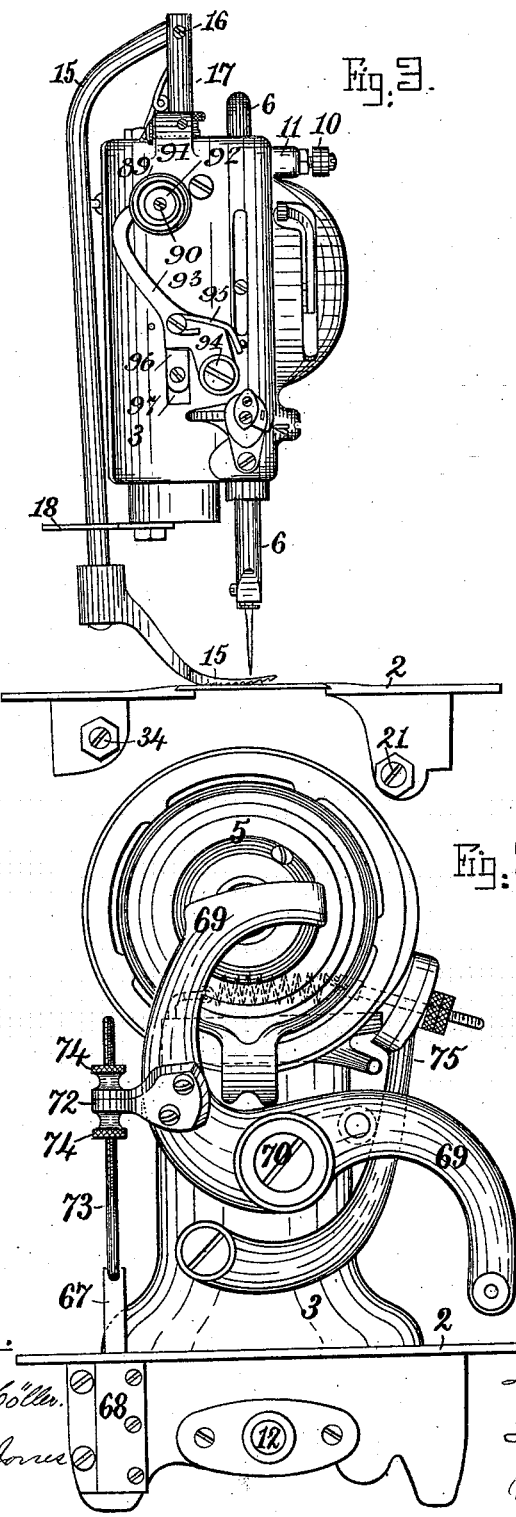

L. C. & F. A. WING.
SEWING MACHINE FOR BARRING AND TACKING.

No. 601,390. Patented Mar. 29, 1898.

Witnesses:
Laurits N. Möller
Charles W. Jones

Inventors
Lingan C. Wing & Frank A. Wing
by Henry Chadbourn their Atty.

(No Model.) 7 Sheets—Sheet 4.

L. C. & F. A. WING.
SEWING MACHINE FOR BARRING AND TACKING.

No. 601,390. Patented Mar. 29, 1898.

(No Model.) 7 Sheets—Sheet 5.

L. C. & F. A. WING.
SEWING MACHINE FOR BARRING AND TACKING.

No. 601,390. Patented Mar. 29, 1898.

Witnesses.
Laurity H. Möller.
Charles H. Jones

Inventors
Lingan C. Wing
and
Frank A. Wing
by Henry Chadbourn
their Atty.

THE NORRIS PETERS CO., PHOTO-LITHO., WASHINGTON, D. C.

(No Model.) 7 Sheets—Sheet 6.
L. C. & F. A. WING.
SEWING MACHINE FOR BARRING AND TACKING.
No. 601,390. Patented Mar. 29, 1898.
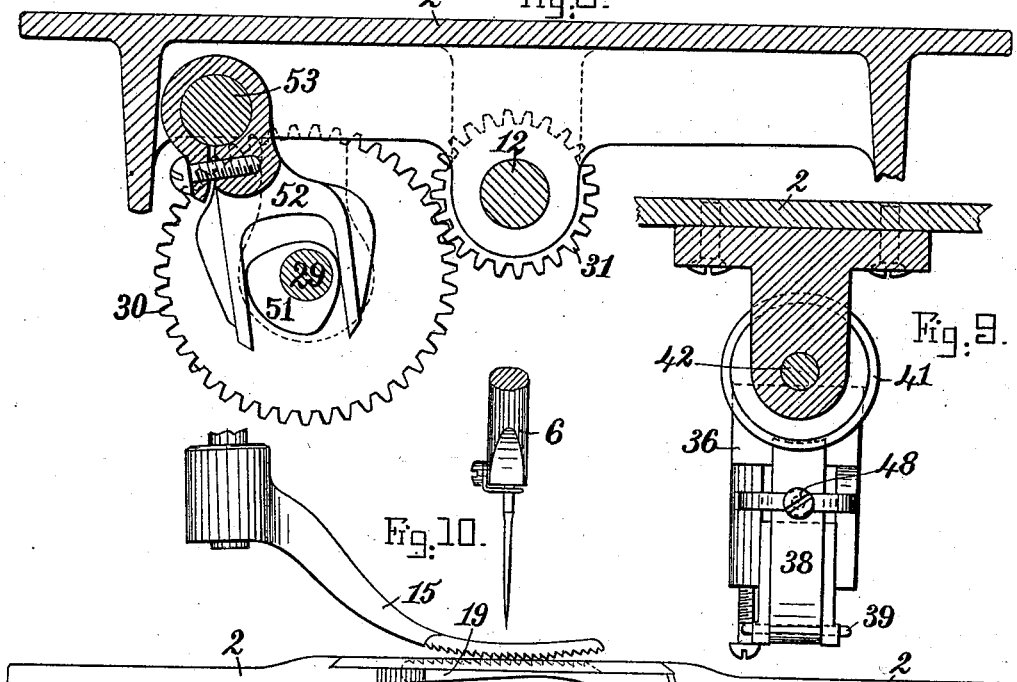
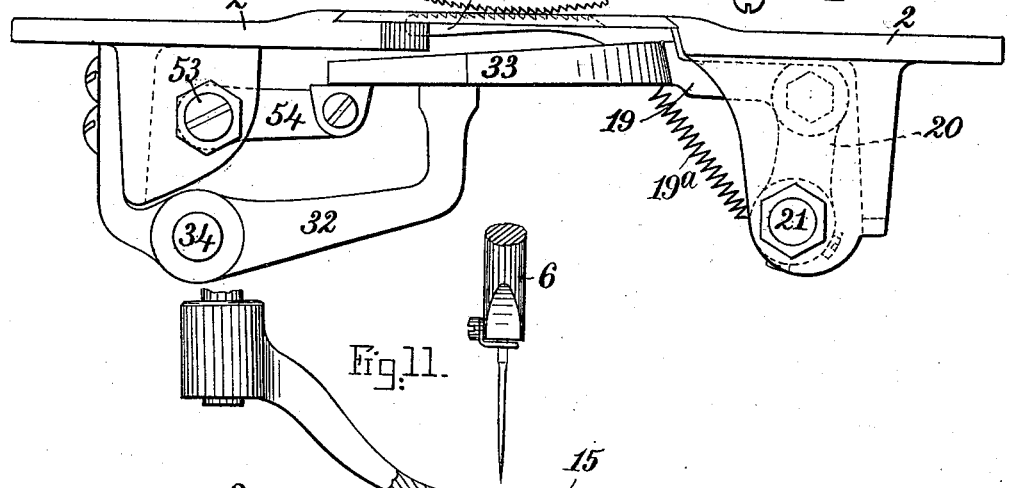
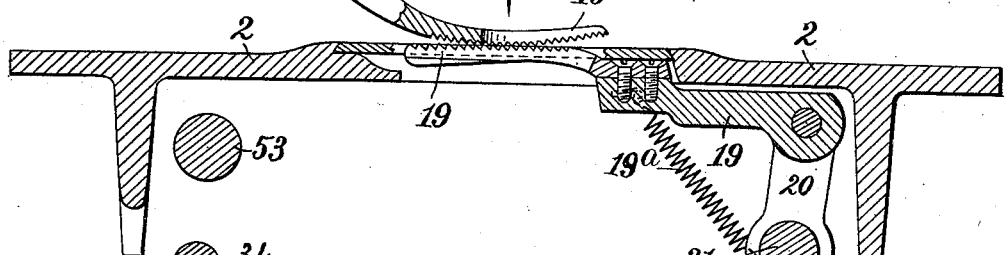
Witnesses.
Lauritz W. Möller
Charles W. Jones
Inventors
Lingan C. Wing and Frank A. Wing
by Henry Chadburn
their Atty.

(No Model.) 7 Sheets—Sheet 7.

L. C. & F. A. WING.
SEWING MACHINE FOR BARRING AND TACKING.

No. 601,390. Patented Mar. 29, 1898.

Witnesses.
Lauritz N. Möller
Charles W. Jones.

Inventors
Lingan C. Wing
and
Frank A. Wing
by Henry Chadburn
their Atty.

THE NORRIS PETERS CO., PHOTO-LITHO., WASHINGTON, D. C.

UNITED STATES PATENT OFFICE.

LINGAN C. WING, OF BOSTON, MASSACHUSETTS, AND FRANK A. WING, OF PROVIDENCE, RHODE ISLAND, ASSIGNORS TO THE WING BUTTON SEWING MACHINE COMPANY, OF BOSTON, MASSACHUSETTS.

SEWING-MACHINE FOR BARRING AND TACKING

SPECIFICATION forming part of Letters Patent No. 601,390, dated March 29, 1898.

Application filed March 18, 1896. Serial No. 583,805. (No model.)

*To all whom it may concern:*

Be it known that we, LINGAN C. WING, of Boston, in the county of Suffolk and State of Massachusetts, and FRANK A. WING, of Providence, in the county of Providence and State of Rhode Island, citizens of the United States, have invented certain new and useful Improvements in Sewing-Machines for Barring and Tacking; and we do hereby declare the following to be a full, clear, and exact description of the invention, such as will enable others skilled in the art to which it appertains to make and use the same.

This invention relates to improvements in sewing-machines used to form a bar or stay across the end of pockets, buttonholes, and in other places where such bars or stays are desired, which machines are known in the trade as "bar-tacking" machines.

The invention consists in the various arrangements and combinations of parts and devices, as will be more fully described in this specification, and particularly set forth in the claims forming a part thereof. It is carried out substantially as follows, reference being had to the accompanying drawings, which form an essential part of this specification, and whereon—

Figure 4:
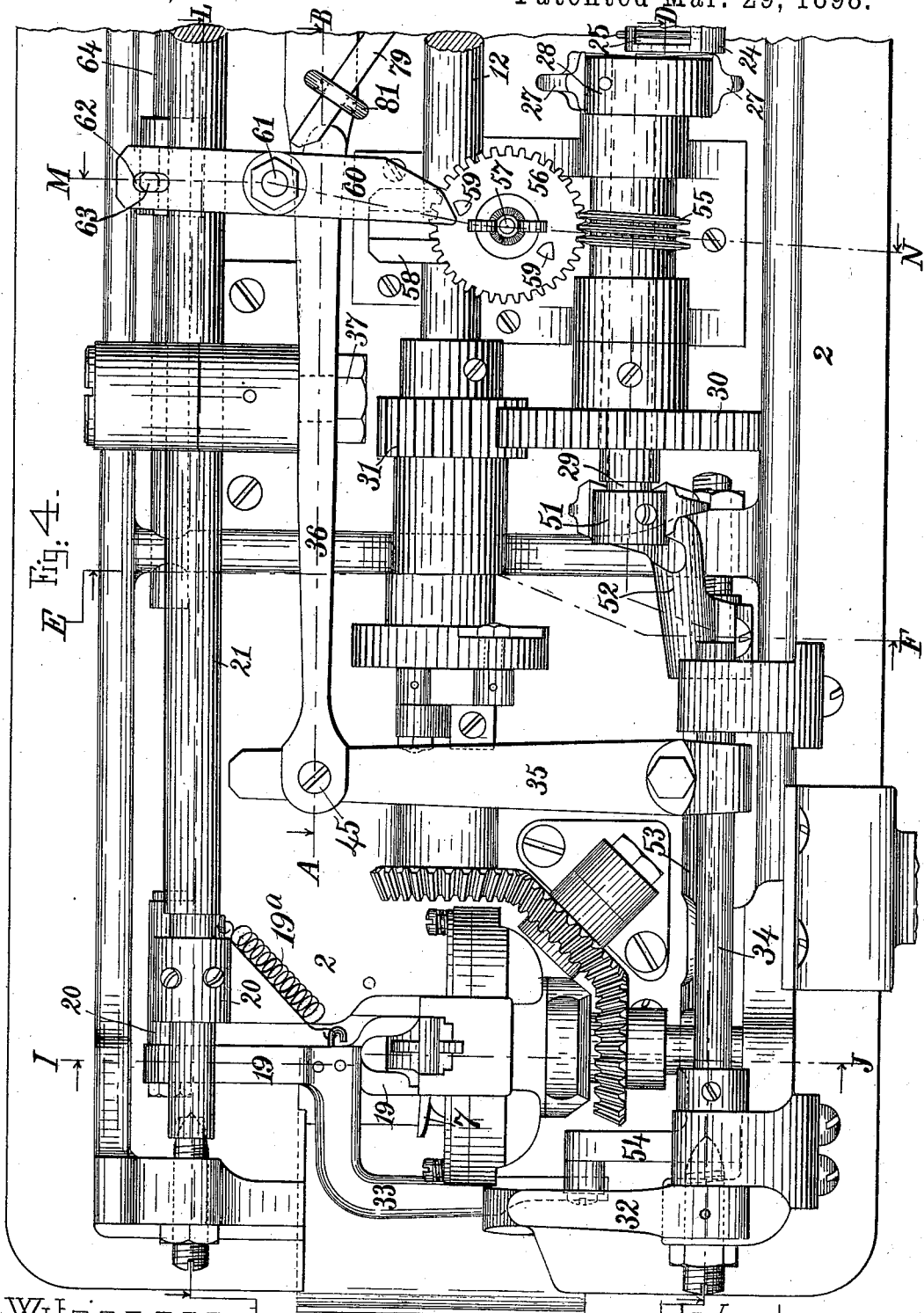
Figure 5:
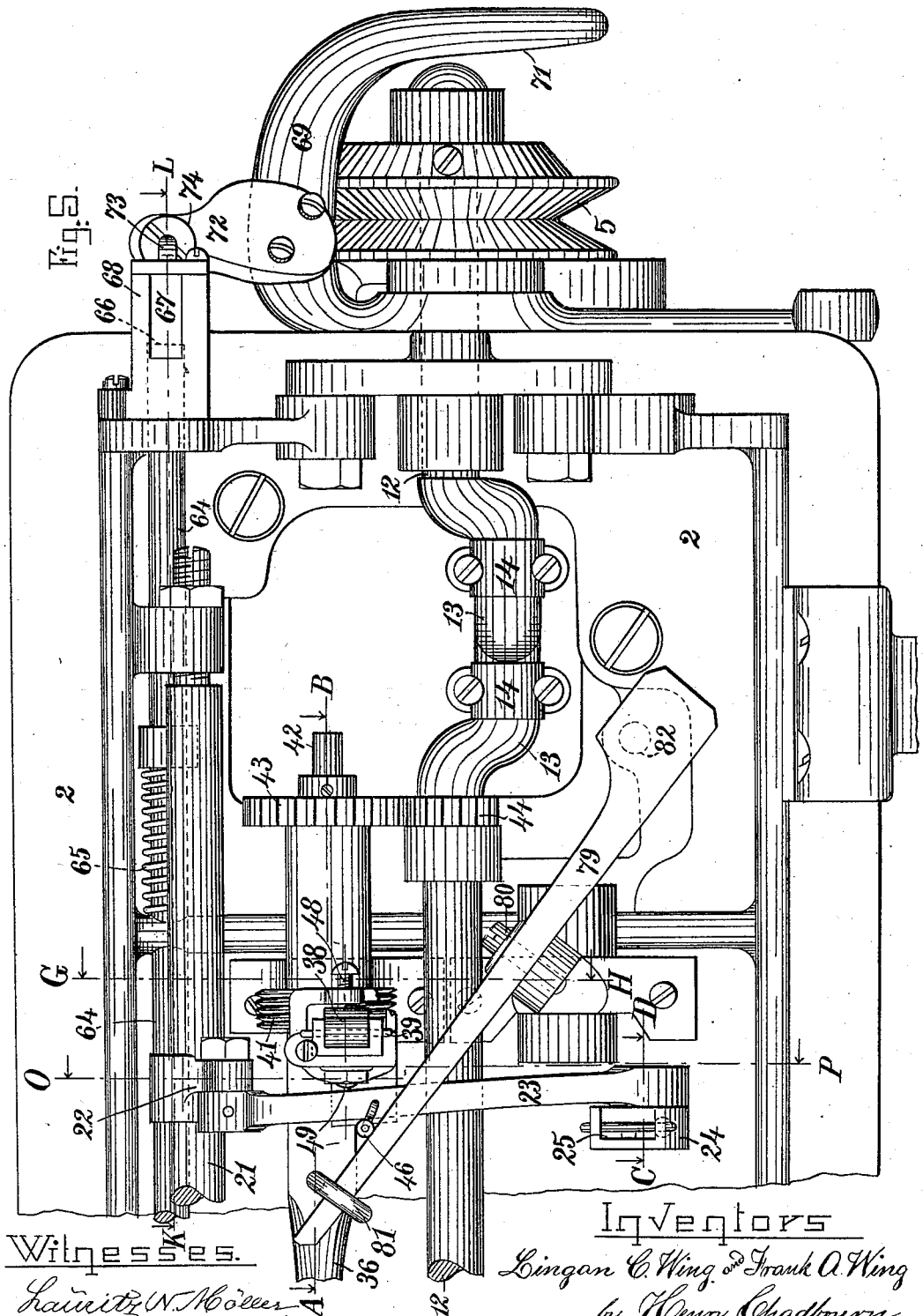
Figure 6:
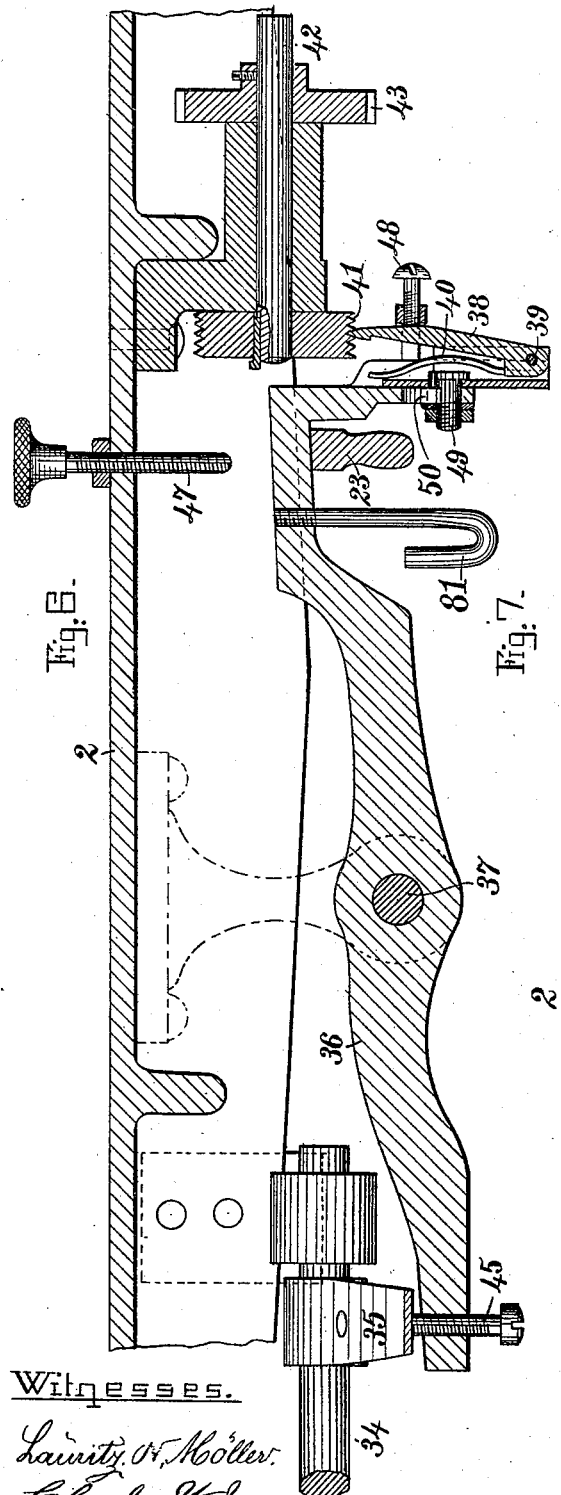
Figure 7:
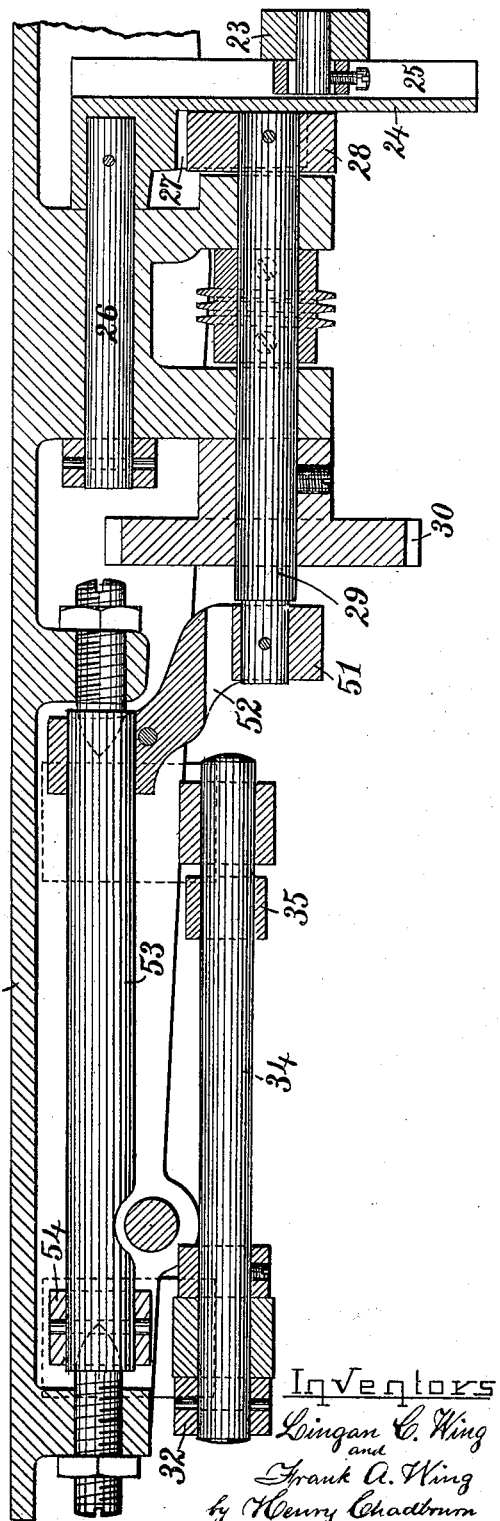
Figure 12:
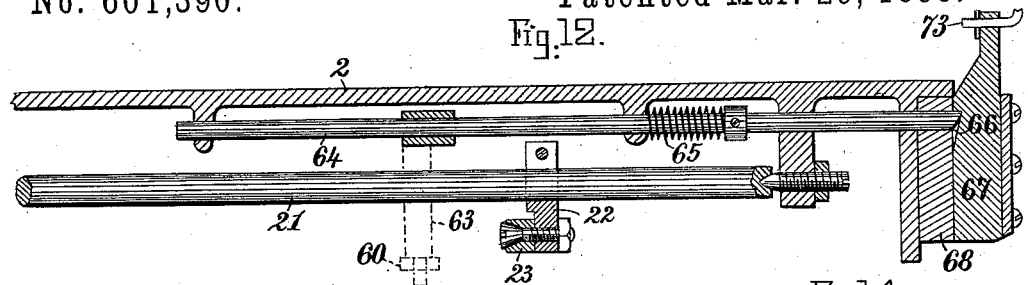
Figure 13:
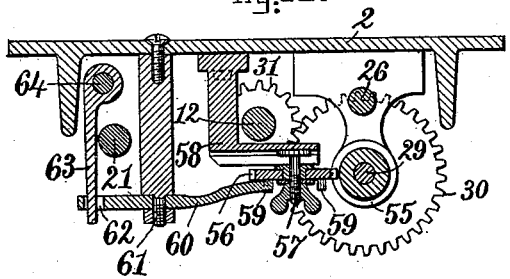
Figure 14:
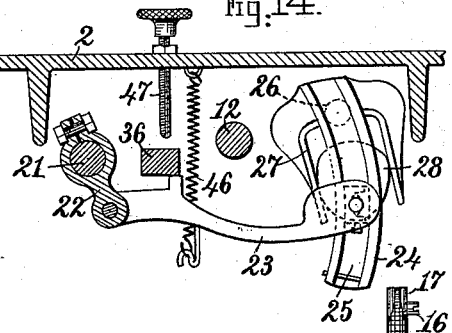
Figure 15:
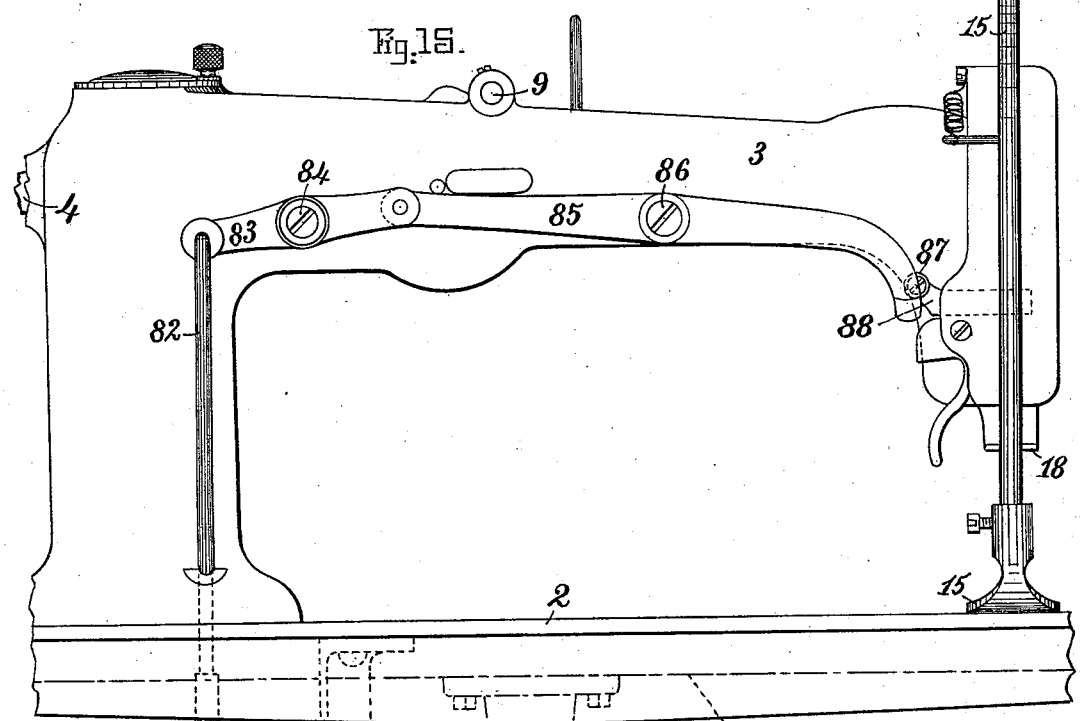

Figure 1 represents a front elevation of the improved machine, showing the top of a suitable stand, upon which it is mounted. Fig. 2 represents a side elevation of the machine as seen from $x$ in Fig. 1, showing the same removed from the stand. Fig. 3 represents a partial side elevation of the opposite side of the machine from that shown in Fig. 2, also being shown as removed from its supporting-stand. Figs. 4 and 5 combined represent a bottom view of the bed-plate of the machine, showing the mechanism attached to the under side thereof and showing the same on an enlarged scale from that of Figs. 1, 2, and 3. Fig. 6 represents a longitudinal section on the line A B in Figs. 4 and 5. Fig. 7 represents a longitudinal section on the line C D in Figs. 4 and 5. Fig. 8 represents a cross-section on the line E F in Fig. 4. Fig. 9 represents a cross-section on the line G H in Fig. 5. Fig. 10 represents a partial detail view of the side of the machine, showing a part of the mechanism employed to cause the proper feeding or movements of the stock while forming the bar or stays. Fig. 11 represents a cross-section on the line I J in Fig. 4. Fig. 12 represents a longitudinal section on the line K L in Figs. 4 and 5, showing a portion of the mechanism used to cause the automatic stopping of the machine when the bar or stay is complete. Fig. 13 represents a cross-section on the line M N in Fig. 4, showing another portion of the mechanism employed to cause the automatic stopping of the machine and to determine the number of revolutions to be made by the driving-shaft before the machine is automatically stopped. Fig. 14 represents a cross-section on the line O P in Fig. 5, showing the mechanism employed to automatically change the feeding of the stock after a certain number of revolutions have been made by the driving-shaft and a consequent number of stitches formed. Fig. 15 represents a partial rear view of the machine, showing the mechanism attached to or operated by a starting-treadle to return the several parts of the machine to their proper positions to form the bar or stay after the machine has been automatically stopped by the stopping mechanism.

Similar parts of the machine are indicated by the same characters on the several views of the drawings.

To properly construct a bar or stay, it is necessary to make a stitch first at one end of the bar and then at the other end thereof, forming a number of cords upon the top of the stock, which cords extend from one end of the bar to be formed to the other end of the same, and which cords will be herein termed the "bar-cords." After the desired number of bar-cords have been formed they are overseamed their entire length by forming a stitch first on one side of the cords and then on the other and forming these stitches more or less closely together, as desired, according to the character of the bar to be formed.

The object of this invention is to provide novel means whereby the stock is automatically reciprocated the desired length to cause the bar-cords to be formed, then slowly fed and stitches formed so as to overseam the entire length of the bar-cords which have been made, and also to automatically stop the machine after the bar-cords have been entirely overseamed. Its object is further to provide suitable means whereby the length of the bar formed is adjusted as desired and the stitches in the overseaming are made more or less apart to suit the purpose for which the bar is intended to be used. With these objects in view the machine is constructed substantially as follows, but slight variations in the mechanism employed might be made without departing from this invention.

As the particular stitch-forming mechanism shown on the drawings as being used in the machine forms no part of this invention and may be varied by the use of any of the suitable and well-known stitch-forming mechanisms now in use, it is deemed unnecessary to enter into a lengthy description of such mechanism, but simply to say that the mechanisms shown and described as being used to form the stitches and to operate the needle-bar are those known and used in the well-known "Wheeler & Wilson" zigzag machine, but a "Singer," a "Standard," or a zigzag machine of any of the other makes might be used to equal advantage, if so desired, with but slight and well-known mechanical changes in our improved mechanisms.

The machine is preferably mounted upon a suitable stand or support 1 and is provided with a base or bed plate 2, a bracket-arm 3, a driving-shaft 4, a driving-pulley 5, a needle-bar 6, and suitable mechanism to vertically reciprocate the needle-bar, a shuttle 7 and mechanism to operate the shuttle, and a mechanism to laterally reciprocate the needle-bar, which mechanism consists of a crank 8, fulcrumed at 9 to the bracket-arm, a connecting-rod 10, adjustably connected to the crank 8 and to the hinged frame 11, within which frame the needle-bar is vertically reciprocated, and a mechanism connected with or operated by the driving-shaft and acting on the crank 8 to intermittingly oscillate said crank, which mechanism has not been shown on the drawings, as it forms no essential part of this invention. From the shaft 12, journaled in bearings on the under side of the bed-plate and rotated by means of the cranks 13 13, and connecting-rods 14 14 from the main driving-shaft 4 the various devices which cause the feeding of the stock and the stopping of the machine derive their motive power.

The mechanism to cause the reciprocation of the material to form the bar-cords upon the top of the same is constructed as follows: The presser-foot 15 is pivoted at 16 to the upper end of the presser-rod 17 and is capable of a forward-and-backward swinging movement on said pivot, being guided in such movements by means of the slotted bracket 18, attached to the bracket-arm. The presser-foot is preferably serrated on its under side to prevent the material from slipping from under it while the machine is reciprocating said material, as will be described. The feed-dog 19 is pivotally attached to the crank 20, which crank is firmly mounted upon the rock-shaft 21. The rock-shaft 21 is intermittingly rocked in its bearings on the under side of the bed-plate by means of the crank 22, firmly mounted on said shaft, the connecting-rod 23, pivotally connected at one end to said crank and at the other end adjustably and pivotally connected to the crank 24 within a groove 25 in said crank, which crank is firmly mounted upon the rock-shaft 26, journaled in a bearing on the under side of the bed-plate, the crank 24 being provided with the fork 27, which embraces the cam 28, firmly mounted upon the rotating shaft 29, rotated within its bearings on the under side of the bed-plate, and the spur-gear 30, firmly mounted on said shaft and meshing into the spur-gear 31 on the rotating shaft 12, provided, however, that the connection of the connecting-rod 23 with the grooved crank 24 does not coincide with the axis of the rock-shaft 26. (See Figs. 3, 4, 5, 7, and 14.) The cam 28 is so shaped that it imparts an intermitting oscillation to the grooved crank 24.

The feed-dog 19 is held upward with a yielding pressure and clamps or holds the material between it and the presser-foot 15 by means of the following mechanism: The arm 32 presses against the under side of a side projection 33 on the feed-dog, which arm is firmly mounted upon the rock-shaft 34, journaled in bearings on the under side of the bed-plate. The flat spring 35 is firmly attached to said shaft, said spring being held upward while the stock is being reciprocated by the means of the lever 36, pivoted at 37 to a bracket on the under side of the bed-plate, the opposite end of said lever being provided with the toothed pawl 38, which is pivoted at 39 to said lever and normally pressed outward by means of the spring 40, the tooth on said pawl resting in one of the teeth on the worm 41. The worm 41 is firmly mounted upon the rotating shaft 42, journaled in bearings on the under side of the bed-plate, which shaft is rotated by means of the spur-gear 43, firmly mounted on said shaft and meshing into the spur-gear 44, firmly mounted on the shaft 12. (See Figs. 4, 5, 7, 9, and 10.)

The pressure of the arm 32 against the feed-dog is adjusted by means of the set-screw 45, screwed through the end of the lever 36 and resting against the spring 35, said pressure being entirely removed from said feed-dog when the worm 41 has rotated a sufficient number of times to screw the pawl 38 toward the lever 36, compressing the spring 40 until said pawl drops from said worm, allowing the spring 35 to turn the lever 36 on its fulcrum and release the pressure of said spring from the arm 32. When the lever 36 is turned on its fulcrum by the dropping of the pawl from the worm and the action of the spring, it also allows the spring 46 to act on the connecting-rod 23 and to adjust the connection of said rod with the grooved crank 24 upward within the groove in said crank toward the axis of the rock-shaft 26, the amount of the adjustment of said connection and also the amount of the movement of the lever 36 being adjusted by means of the set-screw 47, screwed through the bed-plate of the machine for a purpose, as will hereinafter be fully described.

With the various parts of the bar-cord-forming mechanism in the relative positions shown on the drawings, the material clamped and held in position between the feed-dog and the presser-foot, and the shafts 4 and 12 rotating so as to form stitches by the stitch-forming mechanism the operation of the bar-cord-forming mechanism is substantially as follows: The rock-shaft 21 is intermittingly rocked by the action of the cam 28 upon the grooved crank 24, the connection between said cam and the shaft 12, and the connection between said grooved crank and the rock-shaft. This intermitting rocking of the rock-shaft 21 causes an intermitting forward-and-backward movement of the feed-dog through its connection with said shaft. As the feed-dog is meanwhile held upward with a constant yielding pressure against the material which is between it and the presser-foot by the arm 32 and the connections between said arm and the lever 36 it will be seen that the stock is intermittingly reciprocated under the needle held in the needle-bar so as to cause a stitch to be formed at each end of the reciprocations of the stock and the formation of the bar-cords across and on top of the stock joining said stitches. As the stock will continue to be reciprocated and the bar-cords to be made while the feed-dog is held upward against the presser-foot and as said feed-dog is only relieved of its upward pressure by the dropping of the toothed pawl 38 from the worm 41 it will be seen that the number of reciprocations and consequent number of bar-cords formed depends entirely upon the number of revolutions of the worm 41 necessary to cause the pawl 38 to free itself from the worm. To adjust the number of bar-cords to be made, the lever 36 is provided with a set-screw 48, which limits the movement of pawl 38 from the lever 36, caused by the action of the spring 40 on said pawl, and thereby regulates the number of the threads of the worm covered by the movement of the pawl. The amount of reciprocation imparted to said material and the consequent length of the bar-cords formed by the reciprocations is adjusted by the following means:

The oscillations of the grooved crank 24 are constant or of the same amount during all conditions of the working of the machine, and as the rocking motion of the rock-shaft 21 is imparted to said rock-shaft from the oscillations of the grooved crank 24, through the connecting-rod 23, the amount of said rocking motion will depend upon the distance that the connection between the grooved crank and the connecting-rod is from the center on which said grooved crank oscillates—that is to say, the adjustment of the connection between the connecting-rod 23 and grooved crank 24 within the groove in said crank to or from the axis of the rock-shaft 26 will vary the amount of rocking motion imparted to the rock-shaft 21, which, through the connection between the rock-shaft 21 and the feed-dog 19, will vary the amount of reciprocation given of the stock held between the feed-dog and the swinging presser-foot 15, and consequently vary the lengths of the bar-cords formed.

The spring 46 tends to adjust the connection of the connecting-rod 23 with the grooved crank 24 toward the rock-shaft 26, said connecting-rod being limited in such an adjustment by its contact with the lever 36. Said lever 36 is limited in one direction by the set-screw 47, as above described, and in the other direction by the adjustment of the position of the pawl 38 upon the end of the lever by means of the nut and bolt 49 and the slot 50, as shown in Fig. 6. Thus it will be seen that the adjustment of the set-screw 47 determines the movement of the connecting-rod 23 in the grooved crank 24 toward the axis of the rock-shaft 26 and that the adjustment of the pawl 38 upon the end of the lever 36 will determine the movement of the connecting-rod 23 outward within the groove 25 in the grooved crank, and consequently determines the adjustments of the length of the bar-cords to be made on the machine.

The mechanism to cause the overseaming of the bar-cords is constructed substantially as follows: When by the movements of the worm 41 the lever 36 is released and is allowed to be moved on its fulcrum by the action of the springs 35 and 46, the connecting-rod 23 will be moved in the groove of the grooved crank 24 toward the axis of the rock-shaft 26, on which said crank is mounted. This movement of the connecting-rod will lessen the rocking movement imparted to the rock-shaft 21 from the rock-shaft 26, and at the same time the movement of the lever 36 will remove the pressure of said lever from the spring 35 and thereby release the upward pressure of the feed-dog against the swinging presser-foot. After the releasing of the upward pressure of the feed-dog said feed-dog partakes of the regular four motions, as is common in sewing-machines where the stock is intermittingly fed in one direction. By these motions said feed-dog intermittingly feeds the stock slowly from the front toward the back of the machine. On the machine illustrated by the drawings the intermitting feeding of the stock from front toward the back of the machine is accomplished substantially as follows: The forward-and-backward movement of the feed-dog is caused by the same mechanism which gave it its forward-and-backward movement while forming the bar-cords, only said movement is lessened by the adjustment of the connecting-rod 23 in the grooved crank 24, as above described.

The upward-and-downward movement of the feed-dog is caused by the cam 51, firmly mounted on the rotating shaft 29, which cam acts upon the forked crank 52, mounted on the rock-shaft 53, causing said shaft to intermittingly but slightly rock in its bearings on the under side of the bed-plate.

The crank-arm 54 is firmly mounted upon the rock-shaft 53 and has its outer end resting against the under side of the side projection 33 on the feed-dog in such a manner that when the rock-shaft is intermittingly rocked it will cause said crank-arm to intermittingly raise said feed-dog, it being lowered with said crank-arm by a spring 19$^a$, as shown. The actions of the rock-shafts 21 and 53 upon the feed-dog are so timed in relation to each other as to cause the feed-dog to first move upward, then in the direction it is desired to feed the stock or between substance, then downward, and then in a direction opposite to that in which it is desired to feed the stock or between substance, and by these movements to intermittingly feed the stock from the front toward the back of the machine. The amount of this forward-and-backward movement of the feed-dog, and consequently the amount of the feeding of the stock or the length of the stitch, depends upon the position of the connection between the connecting-rod 23 and the grooved crank 24 within the groove 25, and as such position is governed by the set-screw 47, as shown in Fig. 14, said screw acts as a stitch-regulator. When it is desired to lengthen the stitch, the screw 47 is screwed downward through the bed-plate and limits the upward movements of the lever 36 and connecting-rod 23, and said screw is adjusted in the opposite direction to shorten the stitch, as will be readily understood by reference to the drawings. This intermitting feeding of the stock and the intermitting swinging of the needle-bar by the action of the hinged frame 11 causes the bar-cords previously made to be overseamed, as the needle will form a stitch on one side of the bar-cords at one end of the cords. The cloth will then be fed backward a short distance and a stitch be made on the opposite side of the bar-cords, and so on until the entire bar-cords have been overseamed, when the machine will be automatically stopped, preferably by mechanism substantially as follows and shown on the accompanying drawings in Figs. 1, 2, 4, 5, 12, and 13.

Upon the rotating shaft 29 is firmly mounted the worm 55, which meshes into and slowly rotates the worm-wheel 56, mounted upon a stud 57, which stud is preferably T-headed and adjustable within a correspondingly-shaped groove in a bracket 58 on the under side of the bed-plate. The worm-wheel 56 is provided with one or more projecting pins 59, which come in contact with the end of the lever 60 as the wheel 56 is rotated and turn said lever on its fulcrum 61. The opposite end of the lever 60 is provided with the slot 62, through which projects the lower end of the arm 63, firmly mounted on the sliding rod 64, which rod slides longitudinally within bearings on the under side of the bed-plate and is pressed outward with a yielding pressure by the means of the spring 65. When the rod 64 is pressed outward by the spring 65, the outer end of said rod rests within an inclined recess 66 in the slide 67, which slides vertically within the guide 68, attached to the bed-plate, substantially as shown in Figs. 5 and 12.

The machine is provided with the usual spring-actuated clutch-operating lever 69, fulcrumed at 70 to the bracket-arm and having incline 71, engaging the hub of the driving-pulley 5 or a tappet attached thereto and operating a suitable clutch to cause a rotary motion to be imparted to the driving-shaft from the driving-pulley when starting the machine. This lever is normally held so as to stop the machine by the influence of its actuating-spring. The ear or projection 72 is attached to or made in one piece with the lever 69, said ear being connected to the slide 67 by means of the rod 73, which is attached to said slide and passes loosely through a perforation in said ear, being provided with the nuts 74 74, one above and one below said ear, by which the length of the connecting-rod or distance between the ear and slide is adjusted.

It will be seen that as the projections 59 are rotated with the worm-wheel they will in turn engage the end of the lever 60 and by turning said lever on its fulcrum will cause the rod 64 to be withdrawn from the incline-recess 66 in the slide 67 and allow said slide to move downward in its guide. This movement of the slide allows the lever 69 to turn on its fulcrum and by withdrawing the incline 71 operates the clutch, so as to stop the machine. The usual brake 75 is employed to act upon the balance-wheel to overcome any momentum of the driving-shaft when the incline 71 is withdrawn from the hub of the driving-pulley in stopping the machine.

The standard 1 of the machine has a lever 76, fulcrumed at 77 to an ear or bracket attached to said standard, which lever is connected at one end to a suitable treadle by means of the rod 78, which treadle has not been shown on the drawings. The other end of said lever rests against the under side of a second lever 79, fulcrumed at 80 to an ear on the under side of the bed-plate 2. The opposite end of the lever 79 engages the lever 36 or a hook 81 attached to said lever in such a manner that when the treadle which is connected to the rod 78 is operated it will turn the lever 36 on its fulcrum and by lowering the end of said lever to which the pawl 38 is attached will allow the spring 40 to press said pawl outward, so as to engage one of the threads of the worm 41. The action upon the lever 36 also causes said lever to press again against the spring 35 and thereby cause the arm 32 to press the feed-dog upward with a constant but yielding pressure. This action also causes the connection between the connecting-rod 23 and the grooved crank 24 to be moved away from the center of the rock-shaft 26, or to the position to cause the reciprocation of the stock to form the bar-cords, as before described.

The vertical rod 82, Fig. 15, rests against the upper side of the lever 79 and is guided in bearings in the bracket-arm, as shown. The upper end of this rod is pivotally attached to one end of the lever 83, fulcrumed at 84 to the bracket-arm. A second lever 85 is pivoted to the opposite end of the lever 83 and is also fulcrumed at 86 to the bracket-arm. The opposite end of the lever 85 engages the pin and roll 87 on the arm 88, which arm is firmly attached to the presser-rod 17, as shown in Fig. 15. The action of the lever 76 upon the rod 82 when the treadle is depressed is such that it will force the rod upward in its bearing and by so doing will cause the lever 85 to press upward against the under side of the roll 87 and move the presser-rod and its attached presser-foot upward, so as to allow the stock to be removed from between the presser-foot and the feed-dog after the bar-tack has been finished, also to allow the material to be inserted or placed in position to receive a bar-tack. It will be seen that the operation of the treadle to remove the stock not only raises the presser-foot to allow the stock to be removed, but also sets the mechanism into proper position to commence the next bar, as above set forth.

The mechanism is provided with an automatic tension releasing and renewing device which is operated by the raising and lowering of the presser-rod, which device is constructed substantially as follows: To the end of the bracket-arm are attached the spring-pressed tension-disks 89 89, which are loosely mounted upon the stud 90 and pressed together by means of the spring 91, the pressure of which is adjusted by means of the nut 92, as usual. To the end of the bracket-arm is also attached the lever 93, which is fulcrumed at 94 thereto, as shown in Figs. 1 and 3. This lever is wedge-shaped at its upper end, so as to enter between the tension-disks when said lever is turned upon its fulcrum against the influence of the spring 95, acting upon said lever. A block or projection 96 is attached to or made in one piece with the pressure-rod, which block moves upward within a slot 97 when the presser-rod is raised and, engaging the lever 93, turns said lever upon its fulcrum in such a manner as to force the wedge-shaped upper end of said lever between the tension-disks and release the tension on the thread, allowing the thread to be drawn freely from the thread-supply when removing the material from the machine.

Having the various parts of the machine, with the exception of the starting and stopping mechanism and the automatic mechanism to stop the machine, in the position shown on the drawings and the starting and stopping mechanism in position when the machine is stopped, the operation of forming a bar-tack is as follows: The treadle is depressed to raise the presser-foot and the material is placed in proper position between the presser-foot and feed-dog. The presser-foot is then lowered against the stock and the machine is started by the operation of the lever 69, so as to force its inclined surface against the hub of the driving-pulley. This will raise the slide 67 and cause it to be locked by the sliding rod 64 and thereby hold the lever 69 against the influence of its spring-pressure. The stock will then be reciprocated under the needle, as above described, to form the bar-cords until the pawl 38 drops from the worm 41. This will cause the change to be made in the manner of feeding the material, said material being thereby caused to intermittingly feed slowly from the front toward the rear of the machine, as described, so as to cause the overseaming of the bar-cords just made. After a predetermined number of stitches have been made to overseam the bar-cords their entire length one of the pins or projections 59 on the worm-wheel 56 will come in contact with the lever 60 and by so doing will withdraw the rod 64 from the recess in the slide 67 and automatically stop the machine, as above described.

It will be understood that the mechanism used in this invention to cause the operation of the various devices can be changed within the scope of mechanical skill without departing from this the present invention.

We do not wish to confine ourselves to the use of rock-shafts having cranks mounted thereon, as set forth in this specification, as we might in many cases substitute therefor rotating shafts having cams or eccentrics by the use of mechanical skill alone and without departing from our invention as herein set forth.

Having thus fully described the nature, construction, and operation of our invention, we wish to secure by Letters Patent and claim—

1. In a bar-tacking machine, a stitch-forming mechanism, a forward-and-backward-movable presser-foot, a feed-dog having four motions, a forward, backward, upward, and downward movement, and spring-actuated mechanism whereby the feed-dog is pressed against the presser-foot and held there with a yielding pressure, and the material is reciprocated under the needle to form the cords of the bar-tack, and releasing mechanism to release said spring-actuated mechanism and allow the material to be fed in one direction step by step by the feed-dog to tack the bar-cords, for the purpose set forth.

2. In a bar-tacking machine, a stitch-forming mechanism, a forward-and-backward-movable presser-foot, a feed-dog having an adjustable forward-and-backward movement and an upward-and-downward movement, and spring-actuated mechanism whereby the feed-dog is pressed against the presser-foot and held there with a yielding pressure, to reciprocate the material under the needle to form the bar-cords and the amount of said reciprocations is adjusted to vary the length of the bar-cords formed, and an automatic releasing mechanism to release said spring-actuated mechanism to allow the material to be fed in one direction step by step by the feed-dog to tack the bar-cords for the purpose set forth.

3. In a bar-tacking machine, a stitch-forming mechanism, a forward-and-backward-movable presser-foot, a feed-dog having a forward-and-backward movement, an arm to engage said feed-dog, a rock-shaft carrying said arm, a spring also carried by said rock-shaft, and mechanism operating upon said spring to cause said arm to press against the feed-dog with a yielding pressure and to release the arm from its pressure against the feed-dog whereby the material is reciprocated backward and forward under the needle or intermittingly fed in one direction, for the purpose set forth.

4. In a bar-tacking machine, a stitch-forming mechanism, a forward-and-backward-movable presser-foot, a feed-dog having a forward-and-backward movement, an arm to engage said feed-dog, a rock-shaft carrying said arm, a spring also carried by said rock-shaft, a lever fulcrumed to the machine and mechanism whereby said lever is caused to act upon said spring to cause a yielding pressure to be exerted upon the feed-dog and to release the pressure therefrom whereby the material is reciprocated backward and forward under the needle or is intermittingly fed in one direction as desired for the purpose set forth.

5. In a bar-tacking machine, a stitch-forming mechanism, a forward-and-backward-movable presser-foot, a feed-dog having a forward-and-backward movement, an arm to engage said feed-dog, a rock-shaft carrying said arm, a spring also carried by said rock-shaft, a lever fulcrumed to the machine, mechanism whereby said lever is caused to act upon said spring to cause a yielding pressure to be exerted upon the feed-dog and to release the pressure therefrom and a set-screw through said lever to adjust the amount of the pressure on said feed-dog whereby the material is reciprocated backward and forward under the needle or intermittingly fed in one direction as desired, for the purpose set forth.

6. In a bar-tacking machine, a stitch-forming mechanism, a forward-and-backward-movable presser-foot, a feed-dog having a forward-and-backward movement, a rotating shaft, a worm upon said shaft, a lever fulcrumed to the machine, a spring-pressed toothed pawl to engage the teeth of the worm, and connecting mechanism between said lever and the feed-dog operated by the movements of said lever to press the feed-dog against the presser-foot with a yielding pressure when said pawl is in engagement with said worm to form the bar-cords by the reciprocation of the material held between the feed-dog and the presser-foot, but to release said upward pressure of the feed-dog when said pawl is disengaged from the worm by the rotations of the worm, for the purpose set forth.

7. In a bar-tacking machine, a stitch-forming mechanism, a forward-and-backward-movable presser-foot, a feed-dog having a forward-and-backward movement, a rotating shaft, a worm upon said shaft, a lever fulcrumed to the machine, a spring-pressed toothed pawl to engage the teeth of the worm, connecting mechanism between said lever and the feed-dog operated by the movements of said lever to press the feed-dog against the presser-foot with a yielding pressure when said pawl is in engagement with said worm to form the bar-cords by the reciprocations of the stock held between the feed-dog and the presser-foot but to release said upward pressure of the feed-dog when said pawl is disengaged from the worm by the revolutions of the worm, and an adjustable stop to limit the movement of the pawl and the number of teeth of said worm engaged by the pawl, whereby the number of bar-cords formed are determined, for the purpose set forth.

8. A stitch-forming mechanism, combined with a feed-dog, and mechanism to cause said feed-dog to reciprocate, said mechanism including a rock-shaft, a grooved crank thereon, a connecting rod or link loosely held within the groove in said crank and adjustable therein toward or from the axis of said rock-shaft to vary the amount of the reciprocations of the feed-dog, a spring to move said connecting-rod toward said axis and a lever to move and hold said connections away from said axis, for the purpose set forth.

9. A stitch-forming mechanism, combined with a feed-dog, and mechanism to cause said feed-dog to reciprocate, said mechanism including a rock-shaft, a grooved crank thereon, a connecting rod or link loosely held within the groove in said crank and adjustable therein toward or from the axis of said rock-shaft to vary the amount of the reciprocations of the feed-dog, a lever to move and hold said connections away from the axis of the rock-shaft, a spring to move said connecting-rod toward the axis of the rock-shaft and a set-screw to adjust and limit the movement of the connecting-rod toward the axis of the rock-shaft caused by the spring, for the purpose set forth.

10. A stitch-forming mechanism combined with a feed-dog, and mechanism to cause said feed-dog to reciprocate, said mechanism including a rock-shaft, a grooved crank thereon, a connecting rod or link loosely held within the groove in said crank and moved therein toward and from the axis of the rock-shaft to vary the amount of the reciprocations of the feed-dog, a spring to move said connecting-rod toward said axis, a lever to move and hold said connecting-rod away from said axis, a rotating worm, a pawl on said lever engaging said worm to hold said lever in position to keep said connecting-rod away from the axis of said rock-shaft, said pawl being adjustable upon said lever to adjust the movement of said connecting-rod away from the axis of said rock-shaft, for the purpose set forth.

11. In a bar-tacking machine the combination with the stitch-forming mechanism of a zigzag-sewing machine, a forward-and-backward-movable presser-foot, a feed-dog, and mechanism substantially as described whereby said feed-dog is pressed against said presser-foot with a yielding pressure and reciprocated to form the bar-cords on the stock held thereby then released from said pressure and slowly and intermittingly operated to feed the stock so as to overseam said bar-cords, for the purpose set forth.

12. In a sewing-machine, a lever fulcrumed to the machine, and a starting and stopping device operated by the movements of said lever, combined with a worm on the driving-shaft of the machine, a worm-wheel meshing into said worm, a projection on said wheel, a lever fulcrumed to the machine and acted upon by the projection on the worm-wheel, and connections, between the lever acted upon by the projection on the worm-wheel and the lever which operates the starting and stopping mechanism, said connections being actuated by the former lever to operate the latter lever to automatically stop the machine, for the purpose set forth.

In testimony whereof we have affixed our signatures in presence of two subscribing witnesses.

LINGAN C. WING.
FRANK A. WING.

Witnesses as to L. C. W.:
HENRY CHADBOURN,
HARRY N. SQUIRES.

Witnesses as to F. A. W.:
ROBERT JAMES McDERMOTT,
ARTHUR BURTON SWALLOW.